(12) United States Patent
Lin

(10) Patent No.: US 9,518,696 B1
(45) Date of Patent: Dec. 13, 2016

(54) RACK STRUCTURE FOR A RACK ASSEMBLY

(71) Applicant: SHYANG YUNG PLASTICS CO., LTD., Taichung (TW)

(72) Inventor: Chieh Lung Lin, Taichung (TW)

(73) Assignee: SHYANG YUNG PLASTICS CO., LTD., Taichung (TW)

( * ) Notice: Subject to any disclaimer, the term of this patent is extended or adjusted under 35 U.S.C. 154(b) by 0 days.

(21) Appl. No.: 15/141,803

(22) Filed: Apr. 28, 2016

(51) Int. Cl.
| A47B 43/00 | (2006.01) |
| F16M 11/38 | (2006.01) |
| A47F 5/04 | (2006.01) |
| A47F 5/10 | (2006.01) |
| A47B 96/06 | (2006.01) |

(52) U.S. Cl.
CPC .............. *F16M 11/38* (2013.01); *A47B 43/00* (2013.01); *A47B 96/061* (2013.01); *A47F 5/04* (2013.01); *A47F 5/10* (2013.01)

(58) Field of Classification Search
CPC .............. A47F 5/04; A47F 5/10; A47B 43/00; A47B 96/061; Y10T 403/32319; Y10T 403/32377; Y10T 403/32368; Y10T 403/32385; Y10T 403/32401; Y10T 403/32254; Y10T 403/32262; F16M 11/38
USPC ......... 211/196, 197, 205, 133.4, 85.24, 107; 248/166, 434, 435, 168, 170
See application file for complete search history.

(56) References Cited

U.S. PATENT DOCUMENTS

| 97,736 | A | * | 12/1869 | Waterman | A47B 96/1425 211/107 |
| 120,719 | A | * | 11/1871 | Gabriel | A47B 96/1425 211/107 |
| 131,696 | A | * | 9/1872 | Mathewson | A47F 5/02 135/147 |
| 353,332 | A | * | 11/1886 | Tremble | D06F 57/04 211/171 |
| 366,884 | A | * | 7/1887 | Saurbrey | A47C 9/105 248/170 |
| 392,259 | A | * | 11/1888 | Carr | A47G 25/18 211/115 |
| 420,838 | A | * | 2/1890 | Stauffer | A47F 5/02 211/165 |
| 442,578 | A | * | 12/1890 | Freemen | A47F 5/0823 211/57.1 |
| 496,185 | A | * | 4/1893 | Bowling | A47B 96/1425 211/107 |

(Continued)

*Primary Examiner* — Joshua J Michener
*Assistant Examiner* — Devin Barnett
(74) *Attorney, Agent, or Firm* — Bruce Stone LLP; Joseph A. Bruce

(57) ABSTRACT

A rack structure for a rack assembly includes: a base shaft including a first end surface, an opposite second end surface, an inserting recess recessed from the first end surface to the second end surface, an connecting surface located between the first and second end surfaces, and at least three connecting portions which are mounted on the connecting surface and inclined from the first end surface to the second end surface; and at least three connecting arms each including: a jointing portion formed at one end thereof and to be connected to the connecting potion, a support portion formed at another end opposite the jointing portion, and a plurality of hanging holes defined between the jointing portion and the support portion, wherein an extension plane of the second end surface is located between the support portion and the first end surface.

4 Claims, 11 Drawing Sheets

(56) References Cited

U.S. PATENT DOCUMENTS

| | | | | |
|---|---|---|---|---|
| 504,053 A * | 8/1893 | Schermerhorn | A47F 7/10 | 211/170 |
| 723,114 A * | 3/1903 | Witt | A47F 5/04 | 211/205 |
| 1,274,849 A * | 8/1918 | Bullerdick | A01F 25/12 | 211/125 |
| 1,344,660 A * | 6/1920 | Stevenson | D06F 57/12 | 211/171 |
| 1,456,356 A * | 5/1923 | Bentley | A01F 25/12 | 211/196 |
| 1,525,701 A * | 2/1925 | Rose | A47G 25/0664 | 211/196 |
| 1,576,629 A * | 3/1926 | Culp | A47F 5/06 | 211/197 |
| 1,713,673 A * | 5/1929 | Nelson | D06F 57/04 | 248/170 |
| 2,277,332 A * | 3/1942 | Lamb | A47G 25/0664 | 211/171 |
| 2,443,772 A * | 6/1948 | Mappin | A45B 19/04 | 135/25.1 |
| 2,528,003 A * | 10/1950 | Katzberg | A45B 25/08 | 135/39 |
| 2,542,137 A * | 2/1951 | Hanson | A47F 7/24 | 126/30 |
| 2,631,802 A * | 3/1953 | Tunis | A47F 5/06 | 108/159 |
| 2,708,324 A * | 5/1955 | Wedden | A47G 33/06 | 211/1 |
| 3,003,646 A * | 10/1961 | Wolf | A47F 5/04 | 211/107 |
| 3,233,517 A * | 2/1966 | Morrison | F41A 23/12 | 248/166 |
| 3,374,798 A * | 3/1968 | Samuelson | A45B 23/00 | 135/33.7 |
| 3,618,885 A * | 11/1971 | Muller | G10G 5/00 | 211/196 |
| 3,806,399 A * | 4/1974 | Cocjin | A47G 33/06 | 211/196 |
| 3,857,493 A * | 12/1974 | Bourne | D06F 57/04 | 211/197 |
| 4,061,302 A * | 12/1977 | Boone | F16M 11/38 | 248/170 |
| 4,101,037 A * | 7/1978 | Allesch | D06F 57/04 | 211/167 |
| 4,219,594 A * | 8/1980 | Herrera-Cabello | A47G 33/10 | 211/DIG. 1 |
| 4,468,421 A * | 8/1984 | Wang | A47G 33/06 | 211/205 |
| 4,496,615 A * | 1/1985 | Huang | A47G 33/06 | 211/196 |
| 4,905,946 A * | 3/1990 | Wang | F16M 11/20 | 248/170 |
| 4,923,156 A * | 5/1990 | Linneusson | F16M 11/16 | 248/170 |
| 5,060,894 A * | 10/1991 | Hillinger | F16C 11/10 | 211/203 |
| 5,082,222 A * | 1/1992 | Hsu | F16M 11/20 | 248/170 |
| 5,102,079 A * | 4/1992 | Lee | F16M 11/16 | 248/166 |
| 5,213,296 A * | 5/1993 | Lee | F16M 11/20 | 248/166 |
| 5,458,249 A * | 10/1995 | Shang-Lu | D06F 57/125 | 211/196 |
| 5,551,745 A * | 9/1996 | Huang | B60J 7/1282 | 135/133 |
| 5,819,961 A * | 10/1998 | Harris | A47G 25/0671 | 211/196 |
| 5,862,924 A * | 1/1999 | Dumont | A47G 25/0664 | 211/118 |
| 5,869,151 A * | 2/1999 | Chong | A47G 33/12 | 211/196 |
| 5,894,944 A * | 4/1999 | Swift | A47G 23/08 | 211/128.1 |
| 6,131,971 A * | 10/2000 | Chen | A01B 1/022 | 294/51 |
| 6,162,515 A * | 12/2000 | Hill | A47G 33/06 | 211/196 |
| 6,550,795 B1 * | 4/2003 | Schlosser | B60G 7/02 | 280/124.116 |
| 6,561,931 B1 * | 5/2003 | Reeves | A63B 63/004 | 403/102 |
| 6,691,879 B1 * | 2/2004 | Alvarez | B62B 3/02 | 211/175 |
| 6,702,129 B1 * | 3/2004 | Harris | A47G 25/0664 | 211/172 |
| 6,789,772 B2 * | 9/2004 | Eason | F16M 11/16 | 248/166 |
| 6,814,093 B2 * | 11/2004 | You | A45B 25/02 | 135/23 |
| 6,902,139 B2 * | 6/2005 | Wang | D06F 57/12 | 211/196 |
| 7,077,276 B1 * | 7/2006 | Romano | D06F 57/04 | 211/118 |
| 7,288,298 B2 * | 10/2007 | Huang | G09F 19/00 | 211/196 |
| 7,585,552 B2 * | 9/2009 | Meseke | G09F 19/08 | 108/50.12 |
| 8,122,629 B2 * | 2/2012 | Cowgill | G09F 15/0062 | 248/166 |
| 8,186,524 B2 * | 5/2012 | Siahpush | A47F 5/02 | 211/133.4 |
| 8,375,858 B2 * | 2/2013 | Steadman, Sr. | F42B 4/20 | 102/343 |
| 8,381,413 B2 * | 2/2013 | Smith | F26B 25/18 | 211/116 |
| 8,573,417 B1 * | 11/2013 | Anderson | D06F 53/045 | 211/119.01 |
| 8,579,126 B1 * | 11/2013 | Cole | A47F 7/0071 | 211/175 |
| 8,602,229 B2 * | 12/2013 | Raghunathan | D06F 53/04 | 211/119.01 |
| 8,720,349 B1 * | 5/2014 | David | A47B 37/04 | 108/151 |
| 9,010,703 B2 * | 4/2015 | Tresserras Picas | E04H 12/24 | 108/106 |
| 2003/0164348 A1 * | 9/2003 | Seng | D06F 57/04 | 211/196 |
| 2004/0134870 A1 * | 7/2004 | Daubach | D06F 57/04 | 211/196 |
| 2006/0186073 A1 * | 8/2006 | Roe | D06F 59/02 | 211/196 |
| 2013/0034380 A1 * | 2/2013 | Cutsforth | F16M 11/10 | 403/110 |
| 2014/0105670 A1 * | 4/2014 | Plomteux | F16C 11/10 | 403/83 |

* cited by examiner

RACK STRUCTURE FOR A RACK ASSEMBLY

BACKGROUND OF THE INVENTION

Field of the Invention

The present invention relates to a rack, and more particularly to a rack structure for a rack assembly.

Related Prior Art

A conventional rack assembly functionally includes an upper display member and a lower support portion. However, the middle connecting rod assembly for connecting the upper display member and the lower support member includes two connecting members, and the two connecting members have different shapes or configurations, which will increase the production cost.

As shown in FIG. 1, the lower support member 11 and the upper display member 12 of a conventional rack assembly obviously have different structures from each other, as a result, the connecting members of the middle connecting rod 13 for connecting the lower support member 11 and the upper display member 12 are also different from each other, which would lead to increase in production and the mold. In other words, the lower support member 11 is provided with hanging holes 121 of the upper display member 12, and therefore cannot be used as the display member 12. Similarly, the upper display member 12 does not have the support legs 111 of the lower support member 11, and therefore cannot be used as the lower support member 11. Therefore, it requires the uses of different moulds to manufacture the lower support member 11, the upper display member 12, and the connecting members 14, 15 for connecting the lower support member 11 and the upper display member 12, which consequently leads to an increase in the cost of moulds making.

The present invention has arisen to mitigate and/or obviate the afore-described disadvantages.

SUMMARY

The present invention is aimed at providing a rack structure for a rack assembly which can reduce the cost of mould making.

The present invention is also aimed at providing a multipurpose rack structure for a rack assembly.

Therefore, a rack structure for a rack assembly in accordance with the present invention, comprises: a base shaft including a first end surface, an opposite second end surface, an inserting recess recessed from the first end surface to the second end surface, an connecting surface located between the first and second end surfaces, and at least three connecting portions which are mounted on the connecting surface and inclined from the first end surface to the second end surface; and at least three connecting arms each including: a jointing portion formed at one end thereof and to be connected to the connecting potion, a support portion formed at another end opposite the jointing portion, and a plurality of hanging holes defined between the jointing portion and the support portion, wherein an extension plane of the second end surface is located between the support portion and the first end surface.

Preferably, the connecting arms are connected to the base shaft and capable of being switched between a stretched-out position and a folded position, the base shaft is provided with: two positioning protrusions which are located at two opposite edges of each of the connecting portions, and an elongated slot which is formed in each of the connecting portions; the jointing portion of each of the connecting arms is slidably and pivotally connected to the connecting portions of the base shaft, and includes a holding chamber for holding the connecting portions, the holding chamber includes two lateral surfaces, a bottom surface connected between the two lateral surfaces, and an open end which opens toward the connecting surface and is defined by the two lateral surfaces and the bottom surface, two positioning cavities are formed in the two lateral surfaces and located at the open end to selectively engage with or disengage from the positioning protrusions; a pivot is inserted in the jointing portions of the connecting arms and the elongated slot of the base shaft, respectively; when the connecting arms are in the stretched-out position, the positioning protrusions of the base shaft are engaged in the positioning cavities of the connecting arms to prevent the connecting arms from pivoting about the pivot with respect to the connecting portions of the base shaft; when the connecting arms are in the folded position, the positioning protrusions of the base shaft are disengaged from the positioning cavities of the connecting arms, so as to allow the connecting arms to pivot about the pivot with respect to the connecting portions of the base shaft.

Preferably, the base shaft further includes two lateral engaging cavities formed at two opposite edges of each of the connecting portions to engage with or disengage from two lateral engaging protrusions which are formed on an inner surface of the two lateral surfaces of each of the connecting arms, when the connecting arms are in the stretched-out position, the lateral engaging protrusions are engaged with the two lateral engaging cavities, and when the connecting arms are in the folded position, the lateral engaging protrusions are disengaged from the two lateral engaging cavities.

Preferably, the base shaft further includes a top engaging protrusion which is formed on a top surface of each of the connecting portions, each of the connecting arms includes a top engaging cavity formed in the bottom surface, when the connecting arms are in the stretched-out position, the top engaging cavities are engaged with the top engaging protrusions, and when the connecting arms are in the folded position, the top engaging cavities are disengaged from the top engaging protrusions.

With the abovementioned arrangements, the present invention requires less types of components, the connecting arms which have the support portion can be used both for hanging purpose and support purpose, thus reducing the cost for making moulds.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 1:
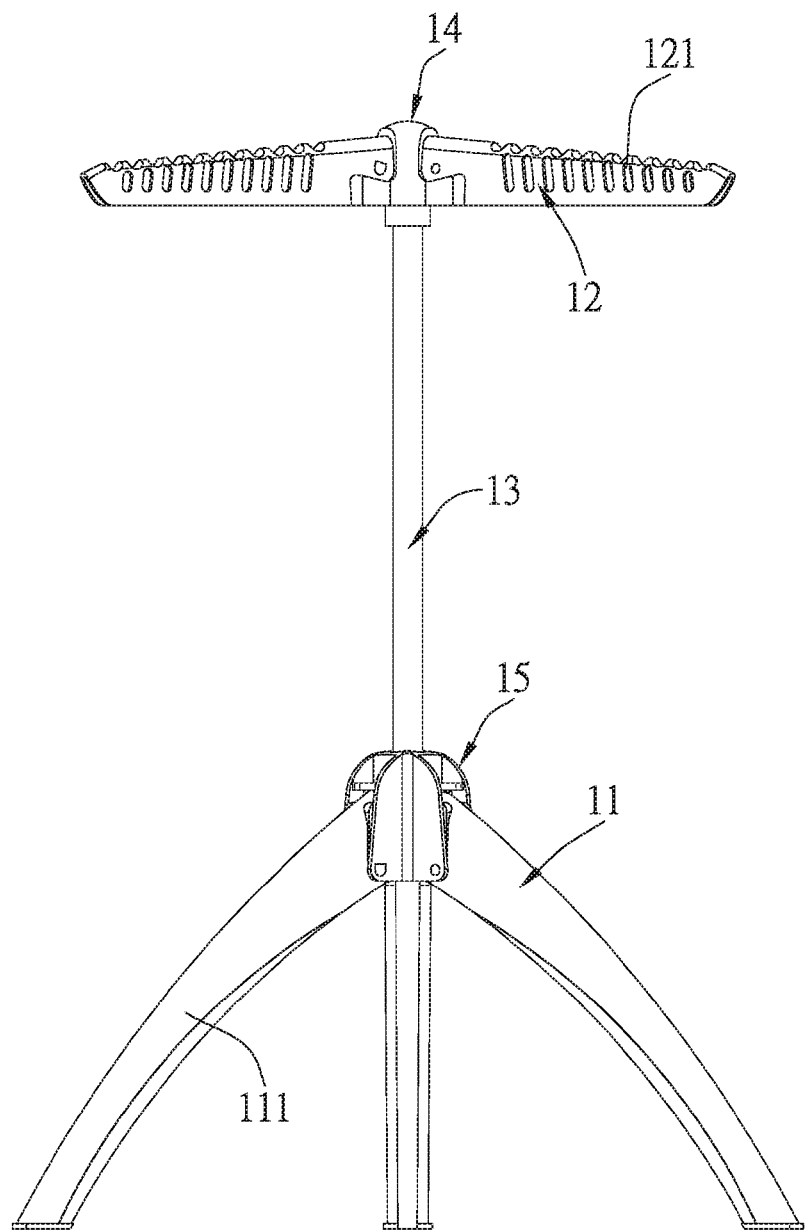
FIG. 1 shows a conventional rack assembly.
Figure 2:
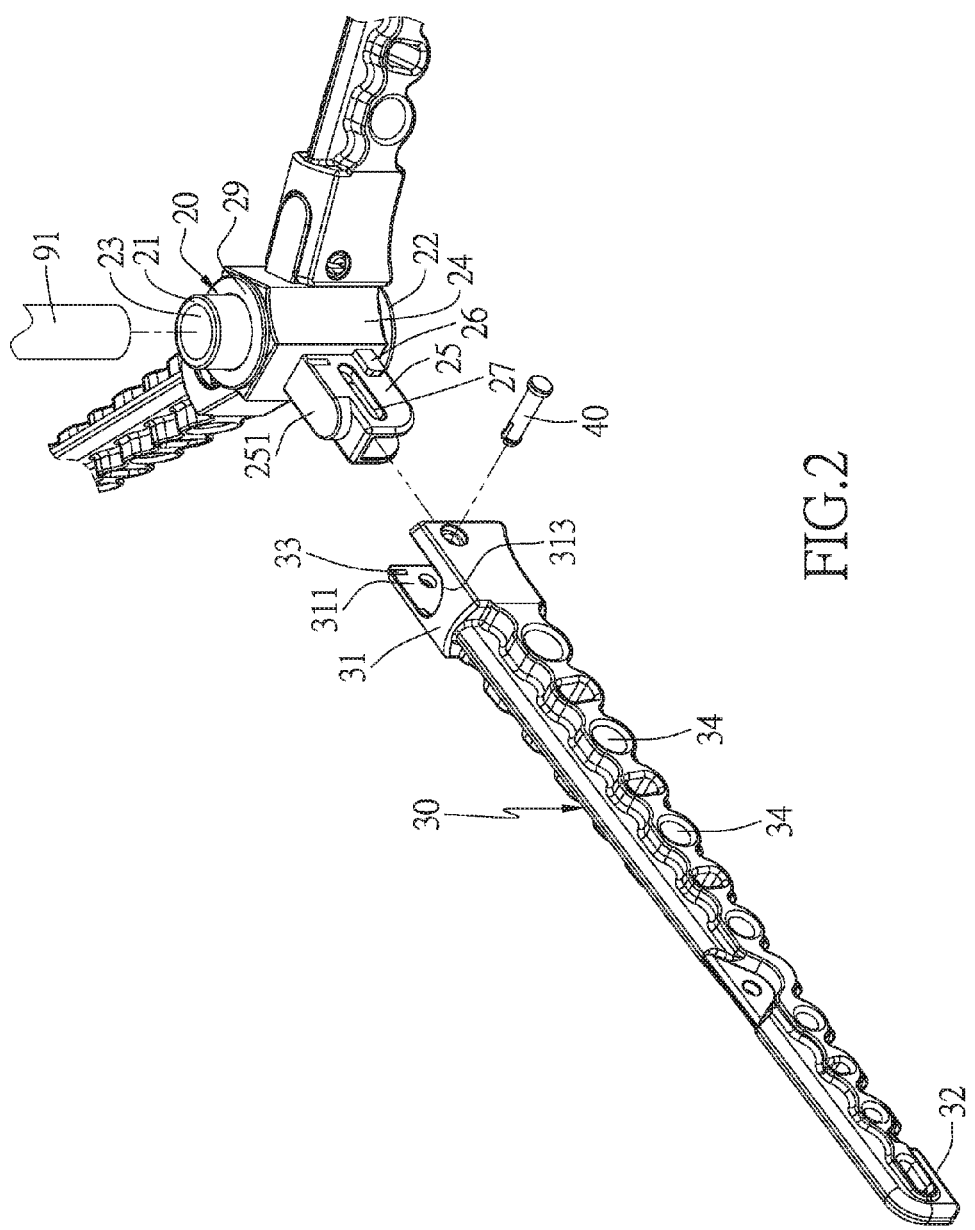
FIG. 2 is an exploded view of a rack structure in accordance with a first preferred embodiment of the present invention.
Figure 3:
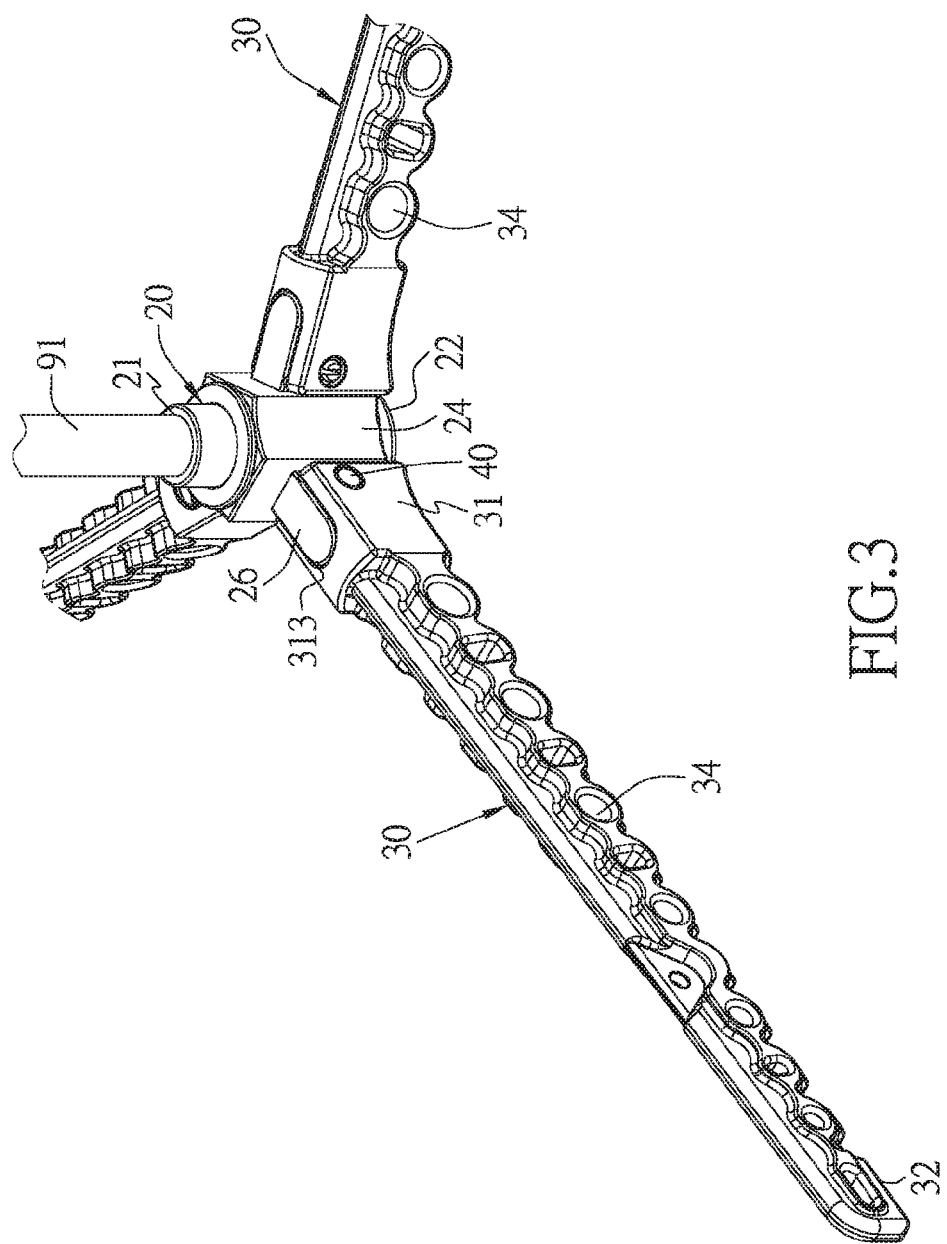
FIG. 3 is an assembly view of the rack structure in accordance with the first preferred embodiment of the present invention.

Referring to FIGS. 2 and 3, a rack structure for a rack assembly in accordance with the first preferred embodiment of the present invention comprises: a base shaft 20 and three connecting arms 30.

The base shaft 20 includes a first end surface 21, an opposite second end surface 22, an inserting recess 23 recessed from the first end surface 21 to the second end surface 22, an connecting surface 24 located between the first and second end surfaces 21, 22, and at least three connecting portions 25 which are mounted on the connecting surface 24 and inclined from the first end surface 21 to the second end surface 22. In this embodiment, a receiving slot (not shown) is formed between the connecting surface 24 and the inserting recess 23 to receive an anti-dust ring 29. The connecting surface 24 can be circular or polygonal in cross section. The inserting recess 23 is provided for insertion of a rod 91.

The connecting arms 30 each include: a jointing portion 31 formed at one end thereof and to be connected to the connecting potion 25, a support portion 32 formed at another end opposite the jointing portion 31, and a plurality of hanging holes 34 defined between the jointing portion 31 and the support portion 32. An extension plane 221 of the second end surface 22 is located between the support portion 32 and the first end surface 21.

What mentioned are the structure relations of the main components of the embodiment, for a better understanding of the present invention, reference should made to the following description in conjunction with the drawings.

Figure 4:
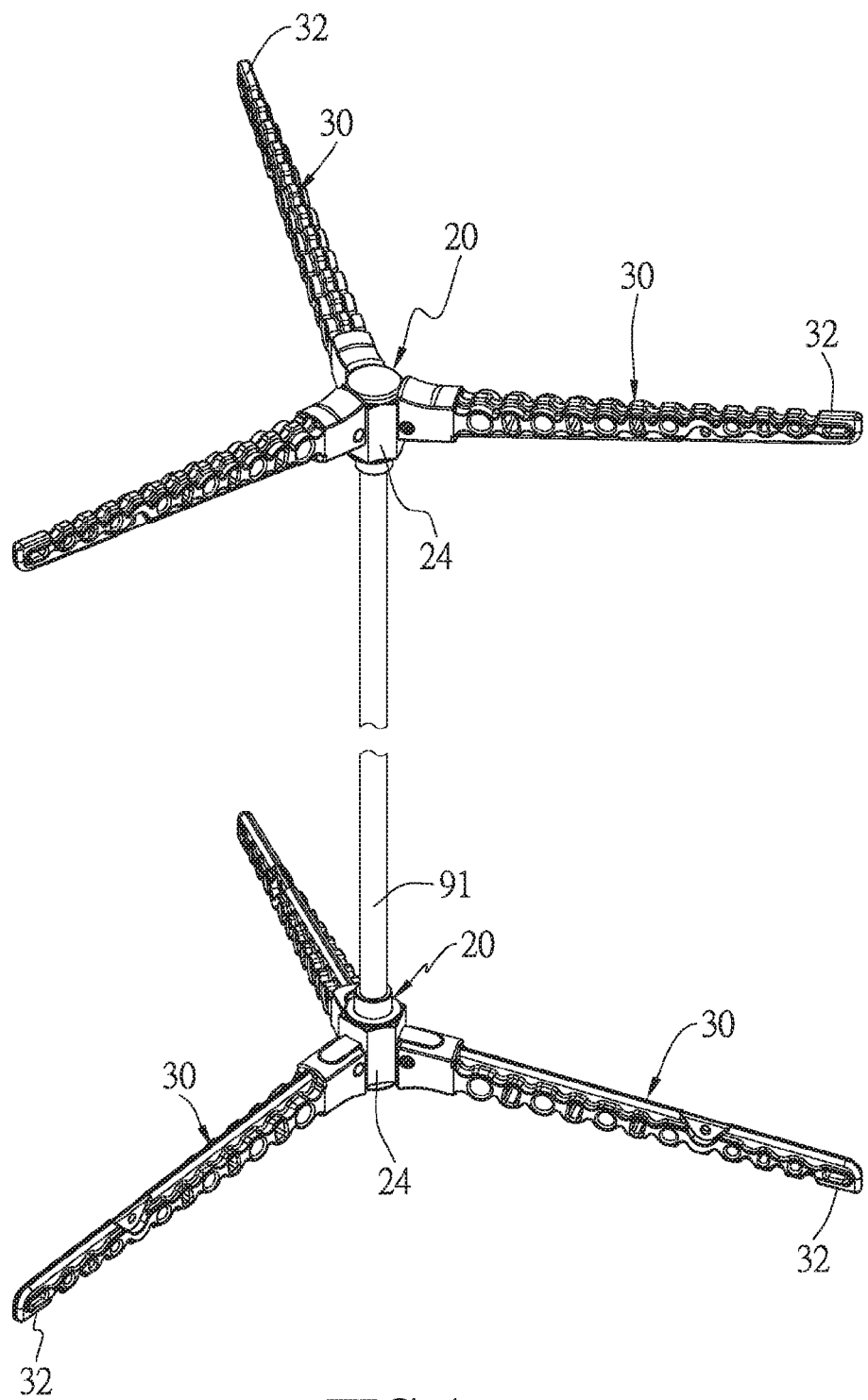
FIG. 4 is an operational view of the rack structure in accordance with the first preferred embodiment of the present invention.
Figure 5:
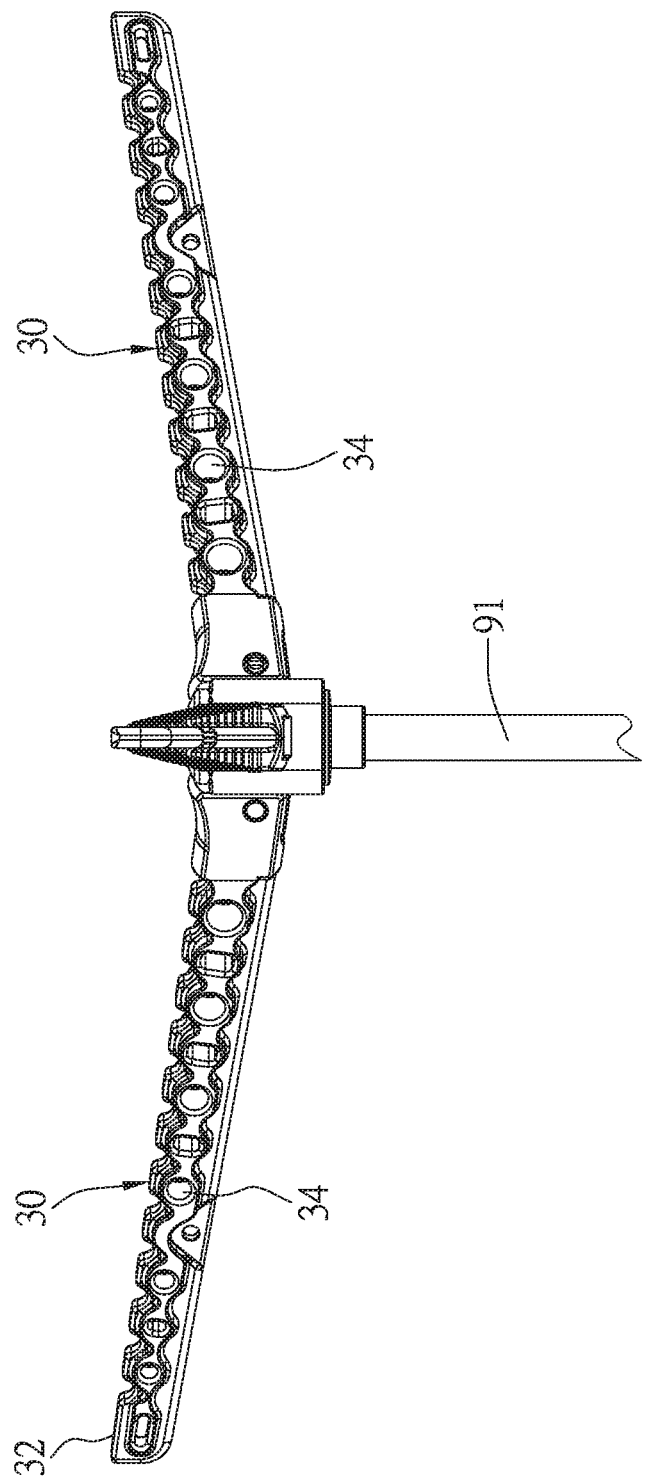
FIG. 5 illustrate that the rack structure in accordance with the first preferred embodiment of the present invention is located at the top end of a rack assembly and used for hanging purpose.
Figure 6:
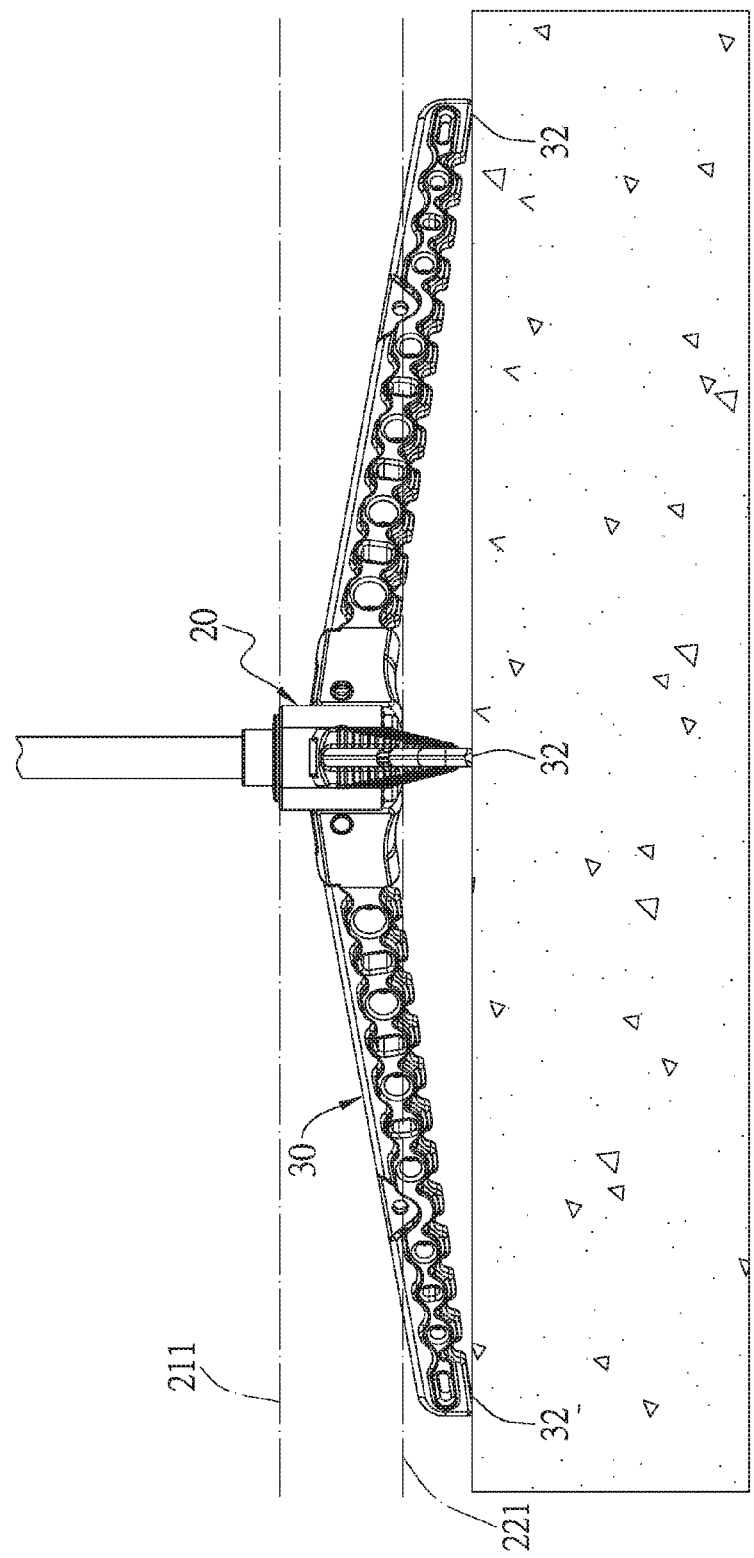
FIG. 6 illustrate that the rack structure in accordance with the first preferred embodiment of the present invention is located at the lower end of a rack assembly and used for support purpose.
Figure 7:
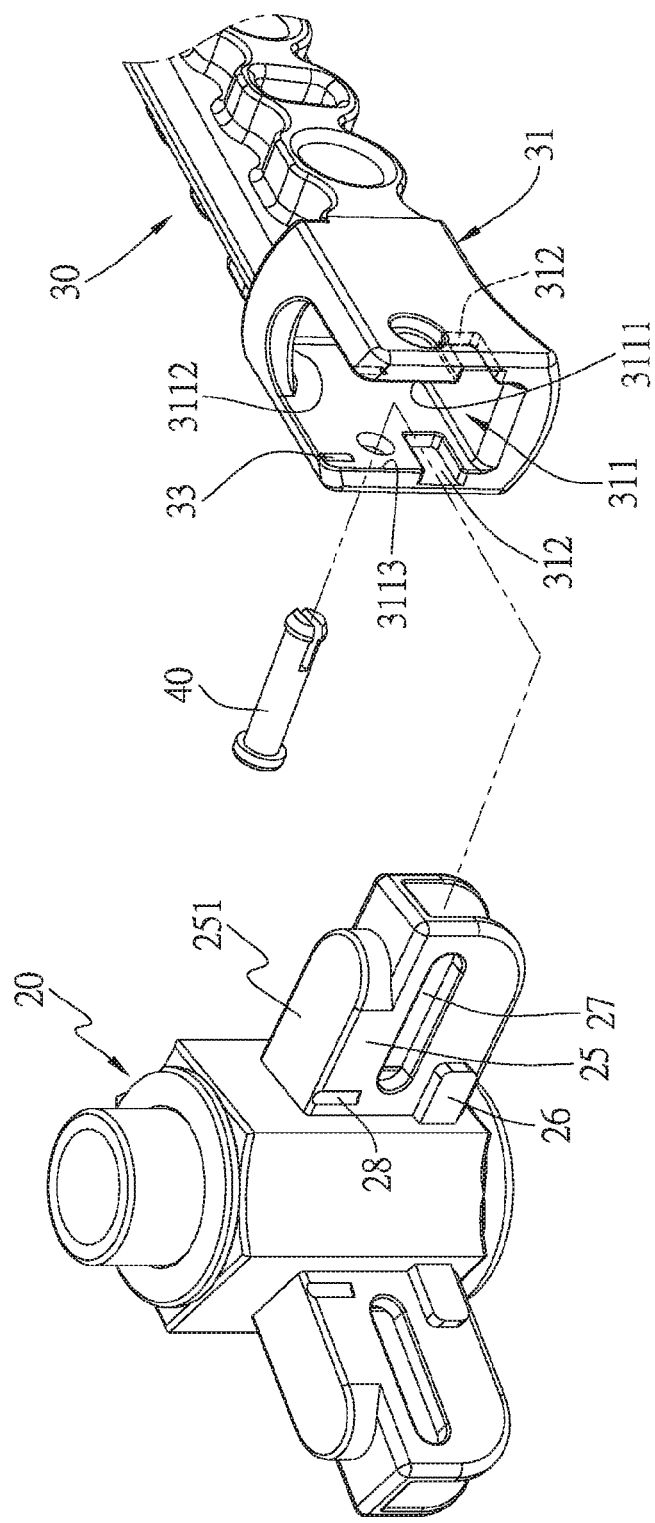
FIG. 7 is an exploded view of a rack structure in accordance with a second preferred embodiment of the present invention.

Referring to FIGS. 4-6, since each of the connecting arms 30 mounted on the base shaft 20 is provided with hanging holes 34, when the rack structure of the present invention is located at the top end of a rack assembly and used for hanging purpose (namely, the inserting recess 23 of the base shaft 20 opens downward), it can be used for hanging objects. Since each of the connecting arms 30 mounted on the base shaft 20 is provided with the support portion 32 which can be placed on the ground, and the extension plane 221 of the second end surface 22 is located between the support portion 32 and the first end surface 21, when the rack structure of the present invention is located at the bottom end of the rack assembly as a support means (namely, the inserting recess 23 of the base shaft 20 opens upward), it can stand on the ground as support. In other words, the connecting arms 30 of the present invention can be used both for hanging (or displaying) and support purposes, the component manufacturing of a rack assembly only requires the manufacturing of the base shaft 20 and the connecting arms 30, and consequently only requires the manufacturing of two types of moulds, thus reducing the cost of mould making.

Referring then to FIGS. 7-10, a rack structure in accordance with the second preferred embodiment of the present invention is similar to the first embodiment, except that:

The connecting arms 30 are connected to the base shaft 20 and can be switched between a stretched-out position and a folded position. To achieve this, the base shaft 20 is further provided with: two positioning protrusions 26 which are located at two opposite edges of each of the connecting portions 25, and an elongated slot 27 which is formed in each of the connecting portions 25 and has an inclination angle equal to an inclination angle of each of the connecting portions 25.

The jointing portion 31 of each of the connecting arms 30 is slidably and pivotally connected to the connecting portions 25 of the base shaft 20, and includes a holding chamber 311 for holding the connecting portions 25. The holding chamber 311 includes two lateral surfaces 3111, a bottom surface 3112 connected between the two lateral surfaces 3111, and an open end 3113 which opens toward the connecting surface 24 and is defined by the two lateral surfaces 3111 and the bottom surface 3112. Two positioning cavities 312 are formed in the two lateral surfaces 3111 and located at the open end 3113 to selectively engage with or disengage from the positioning protrusions 26.

To have a pivoting and connecting function, the rack structure of this embodiment is further provided with a pivot 40 which is to be inserted in the jointing portions 31 of the connecting arms 30 and the elongated slot 27 of the base shaft 20, respectively, and the pivot 40 slides back and forth within the elongated slot 27 when the connecting arms 30 are switched between a stretched-out position and a folded position.

Figure 8:
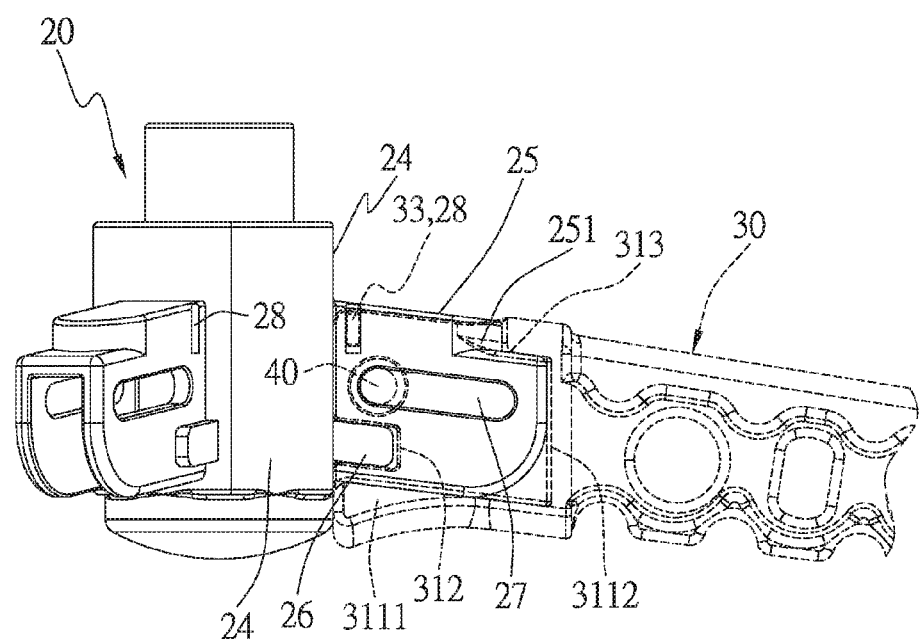
FIG. 8 is a partial perspective view of the second preferred embodiment of the present invention, wherein the connected arms are in the stretched-out position.

As shown in FIG. 8, when the connecting arms 30 are stretched out, the pivot 40 is located at a first end of the elongated slot 27 close to the connecting surface 24, and the positioning protrusions 26 of the base shaft 20 are engaged in the positioning cavities 312 of the connecting arms 30 to prevent the connecting arms 30 from pivoting about the pivot 40 with respect to the connecting portions 25 of the base shaft 20. The base shaft 20 further includes two lateral engaging cavities 28 formed at two opposite edges of each of the connecting portions 25 to engage with two lateral engaging protrusions 33 which are formed on an inner surface of the two lateral surfaces 3111 of each of the connecting arms 30. The base shaft 20 further includes a top engaging protrusion 251 which is formed on a top surface of each of the connecting portions 25. Each of the connecting arms 30 includes a top engaging cavity 313 formed in the bottom surface 3112. When the connecting arms 30 are in the stretched-out position, the top engaging cavities 313 will be engaged with the top engaging protrusions 251. With the abovementioned arrangements, the connecting arms 30 can be connected to the base shaft 20 more stably in a stretched-out manner by the cooperation of the connecting portions 25 and the jointing portions 31.

Figure 9:
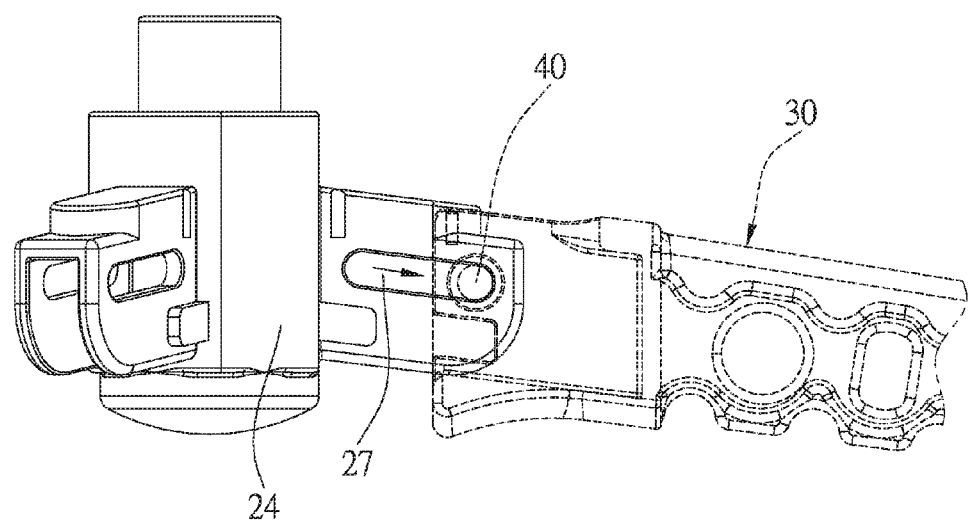
FIG. 9 is a partial perspective view of the second preferred embodiment of the present invention, wherein the connected arms are being folded from a stretched-out position.

As shown in FIG. 9, when being folded from a stretched-out position, the connecting arms 30 are pulled to move away from the connecting surface 24, the pivot 40 moves from the first end close to the connecting surface 24 toward an opposite second end of the elongated slot 27 which is farther away from the connecting surface 24 than the first end.

Figure 10:
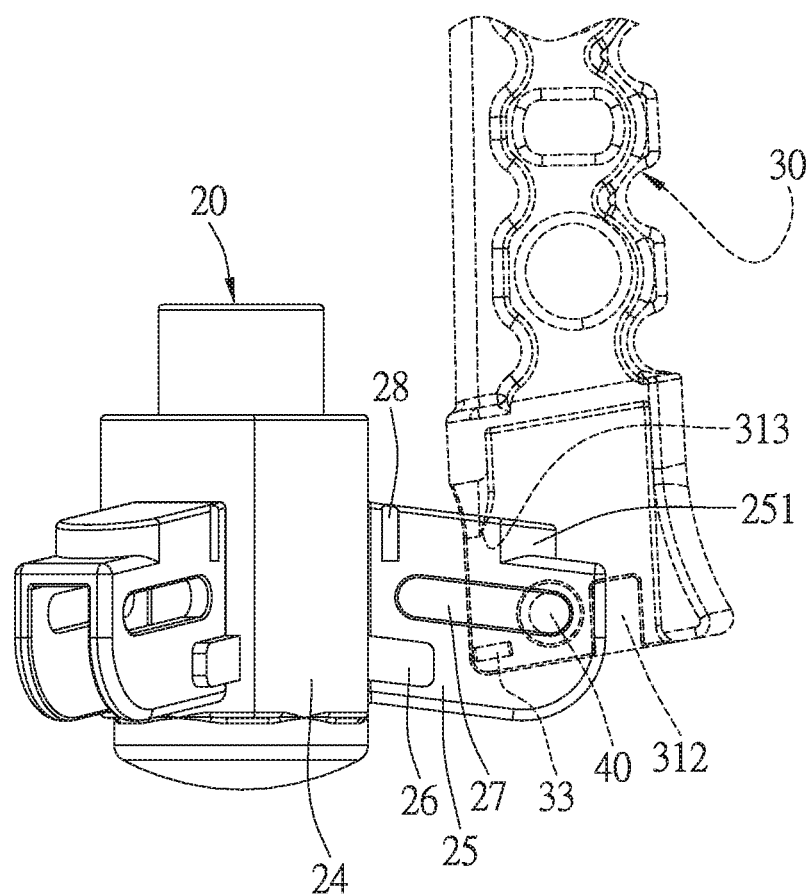
FIG. 10 is a partial perspective view of the second preferred embodiment of the present invention, wherein the connected arms are in the folded position.

As shown in FIG. 10, when the connecting arms 30 are in the folded position, the pivot 40 is located in the second end of the elongated slot 27, the positioning protrusions 26 of the base shaft 20 are disengaged from the positioning cavities 312 of the connecting arms 30, which allows the connecting arms 30 to pivot about the pivot 40 and pivot from the connecting portions 25 of the base shaft 20 toward the first end surface 21. The lateral engaging protrusions 33 are disengaged from the lateral engaging cavities 28, and more specifically, the top engaging cavities 313 are disengaged from the top engaging protrusions 251, and located above the connecting portions 25 of the base shaft 20. By moving the pivot 40 from the first end close to the connecting surface 24 to the second end of the elongated slot 27, the connecting arms 30 can be easily and smoothly folded into a folded position where the connecting arms 30 are in parallel to the base shaft 20, thus reducing the overall size of the rack assembly.

Figure 11:
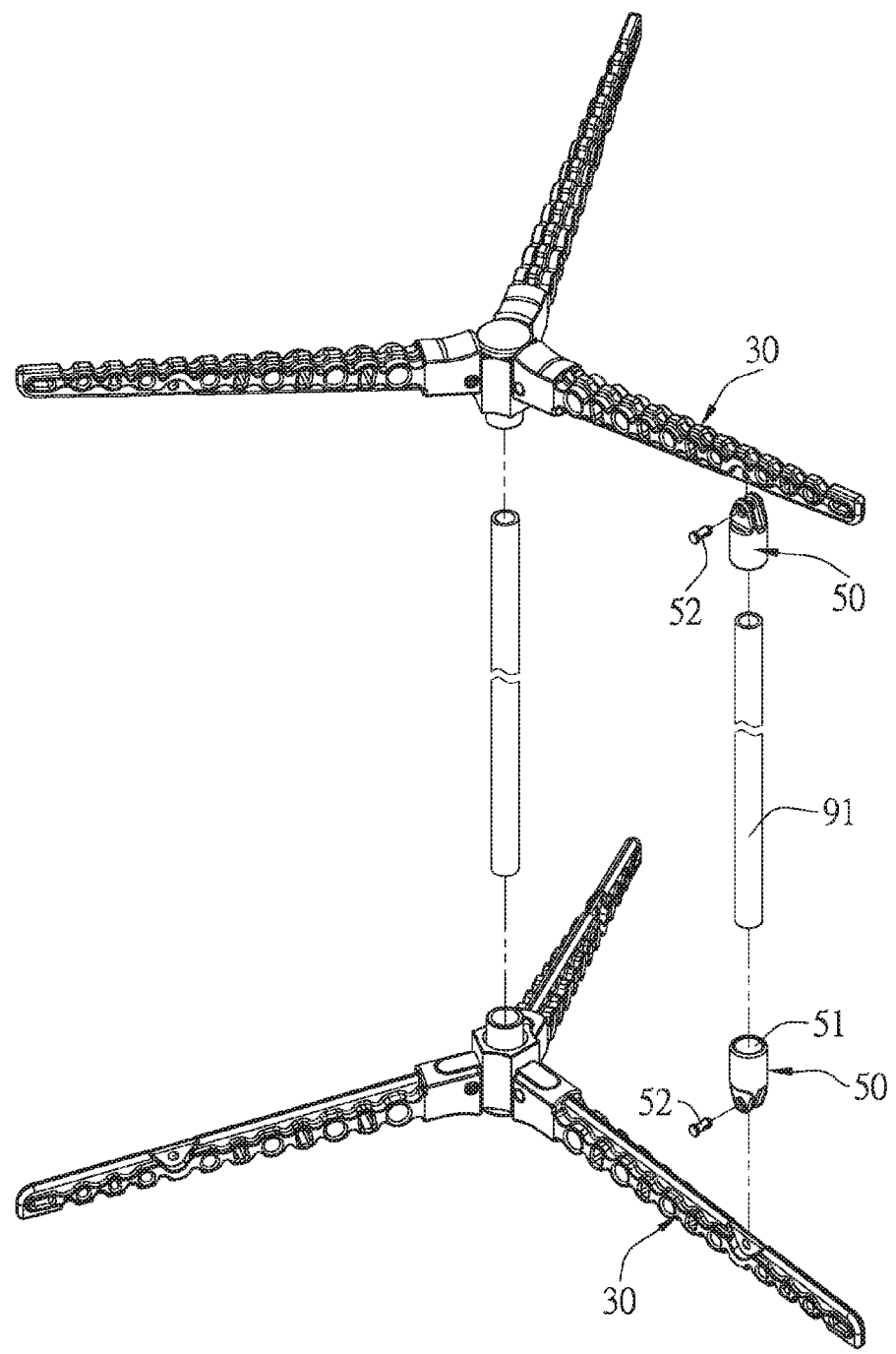
FIG. 11 is another operational view of the rack structure of the second preferred embodiment of the present invention.

Referring then to FIG. 11, each of the connecting arms 30 of the first or second preferred embodiment can further be provided with a support sleeve 50 which is connected to the connecting arms 30 by a pin 52. Each support sleeve 50 includes a rod recess 51 which is recessed from the extension plane 221 of the second end surface 22 toward an extension plane 211 of the first end surface 21, so that the rod 91 can be inserted in the rod recesses 51 of the support sleeves 50 to provide a better support for the rack assembly.

With the abovementioned arrangements, the present invention requires less types of components, the connecting arms 30 which have the support portion 32 can be used both for hanging purpose and support purpose, thus reducing the cost for making moulds.

While we have shown and described various embodiments in accordance with the present invention, it is clear to those skilled in the art that further embodiments may be made without departing from the scope of the present invention.

What is claimed is:

1. A rack structure for a rack assembly, comprising:
    a base shaft including a first end surface, an opposite second end surface, an inserting recess recessed from the first end surface to the second end surface, a connecting surface located between the first and second end surfaces, and at least three connecting portions which are mounted on the connecting surface and inclined from the first end surface to the second end surface; and
    at least three connecting arms each including: a jointing portion formed at one end thereof and to be connected to the connecting potion, a support portion formed at another end opposite the jointing portion, and a plurality of hanging holes defined between the jointing portion and the support portion, wherein an extension plane of the second end surface is located between the support portion and the first end surface;
    wherein the connecting arms are connected to the base shaft and capable of being switched between a stretched-out position and a folded position, the base shaft is provided with: two positioning protrusions which are located at two opposite edges of each of the connecting portions, and an elongated slot which is formed in each of the connecting portions;
    the jointing portion of each of the connecting arms is slidably and pivotally connected to the connecting portions of the base shaft, and includes a holding chamber for holding the connecting portions, the holding chamber includes two lateral surfaces, a bottom surface connected between the two lateral surfaces, and an open end which opens toward the connecting surface and is defined by the two lateral surfaces and the bottom surface, two positioning cavities are formed in the two lateral surfaces and located at the open end to selectively engage with or disengage from the positioning protrusions;
    a pivot is inserted in the jointing portions of the connecting arms and the elongated slot of the base shaft, respectively;
    when the connecting arms are in the stretched-out position, the positioning protrusions of the base shaft are engaged in the positioning cavities of the connecting arms to prevent the connecting arms from pivoting about the pivot with respect to the connecting portions of the base shaft;
    when the connecting arms are in the folded position, the positioning protrusions of the base shaft are disengaged from the positioning cavities of the connecting arms, so as to allow the connecting arms to pivot about the pivot with respect to the connecting portions of the base shaft.

2. The rack structure for the rack assembly as claimed in claim 1, wherein the base shaft further includes two lateral engaging cavities formed at two opposite edges of each of the connecting portions to engage with or disengage from two lateral engaging protrusions which are formed on an inner surface of the two lateral surfaces of each of the connecting arms, when the connecting arms are in the stretched-out position, the lateral engaging protrusions are engaged with the two lateral engaging cavities, and when the connecting arms are in the folded position, the lateral engaging protrusions are disengaged from the two lateral engaging cavities.

3. The rack structure for the rack assembly as claimed in claim 1, wherein the base shaft further includes a top engaging protrusion which is formed on a top surface of each of the connecting portions, each of the connecting arms includes a top engaging cavity, when the connecting arms are in the stretched-out position, the top engaging cavities are engaged with the top engaging protrusions, and when the connecting arms are in the folded position, the top engaging cavities are disengaged from the top engaging protrusions.

4. The rack structure for the rack assembly as claimed in claim 1 further comprising at least one support sleeve to be mounted to the connecting arms, and the support sleeve includes a rod recess which is recessed from the extension plane of the second end surface toward an extension plane of the first end surface.

* * * * *